(12) United States Patent
Vontell

(10) Patent No.: US 8,047,252 B2
(45) Date of Patent: Nov. 1, 2011

(54) MODULAR COMPONENT PRESSURE APPLICATION FIXTURE

(75) Inventor: John H. Vontell, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 292 days.

(21) Appl. No.: 12/339,880

(22) Filed: Dec. 19, 2008

(65) Prior Publication Data

US 2010/0154987 A1 Jun. 24, 2010

(51) Int. Cl.
*B32B 37/00* (2006.01)
(52) U.S. Cl. ........................................ 156/581; 156/580
(58) Field of Classification Search .................. 156/228, 156/580, 581, 583.1; 100/258 A, 258 R
See application file for complete search history.

(56) References Cited

U.S. PATENT DOCUMENTS

| | | |
|---|---|---|
| 3,053,281 A | 9/1962 | Taylor |
| 5,234,530 A | 8/1993 | Freeman, III |
| 5,540,806 A | 7/1996 | Traise |
| 5,656,118 A | 8/1997 | Traise |
| 5,832,605 A | 11/1998 | Leahy et al. |
| 5,836,062 A | 11/1998 | Leahy et al. |
| 5,862,576 A | 1/1999 | Leahy et al. |
| 5,964,688 A * | 10/1999 | Woody et al. ............... 493/207 |
| 6,019,154 A * | 2/2000 | Ma et al. ..................... 156/580 |
| 6,116,315 A | 9/2000 | Field et al. |
| 6,727,466 B2 | 4/2004 | Hutter, III |
| 6,835,262 B1 | 12/2004 | Reis et al. |
| 7,373,862 B2 | 5/2008 | Tyler |

OTHER PUBLICATIONS

"Belleville Washer", from http://en.wikipedia.org/wiki/Belleville_spring, visited Dec. 3, 2008.

* cited by examiner

*Primary Examiner* — James Sells
(74) *Attorney, Agent, or Firm* — Kinney & Lange, P.A.

(57) ABSTRACT

The present invention relates to a pressure application device for curing an adhesive on a component, particularly components of complex geometries. The device comprises a pair of jaws, at least one spring recessed into a cavity defined within the first jaw, and a cap. A first end of a spring partially extends into the cavity and a second end of the spring contacts the cap. When force is applied to the cap, the cap transmits the force through the spring to the first jaw. In order to limit the separation of the cap from the first jaw, a retainer is used.

16 Claims, 7 Drawing Sheets

MODULAR COMPONENT PRESSURE APPLICATION FIXTURE

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by the United States Navy.

BACKGROUND

The present invention relates to devices used to adhesively bond gas turbine components. Gas turbine components can have very intricate geometries that sometimes require composite pieces to be adhered together in order to form the gas turbine component. In order to cure the adhesive, a desired pressure needs to be applied to the composite pieces. Elevated temperatures also may be used in order to cure the adhesive.

Fixturing devices using mechanical tooling are often used to apply pressure to composite materials in order to cure an adhesive under desired conditions. However, in some applications, this curing process sometimes requires applying a specific, known pressure to the composite materials. Such devices may not be designed to adequately accommodate the temperatures needed to thermally cure the particular adhesive. Additionally, these fixturing devices may be bulky and cumbersome to use, and may be too large to use in certain applications.

BRIEF SUMMARY OF THE INVENTION

The present invention relates to a pressure application device for curing an adhesive on a component, particularly components of complex geometries. The device comprises a pair of jaws, at least one spring recessed into a cavity defined within the first jaw, and a cap. A first end of a spring partially extends into the cavity and a second end of the spring contacts the cap. When force is applied to the cap, the cap transmits the force through the spring to the first jaw. In order to limit the separation of the cap from the first jaw, a retainer is used. Besides curing the adhesive with pressure, the pressure application device can be placed into an oven to thermally cure the adhesive.

DETAILED DESCRIPTION

Figure 1:
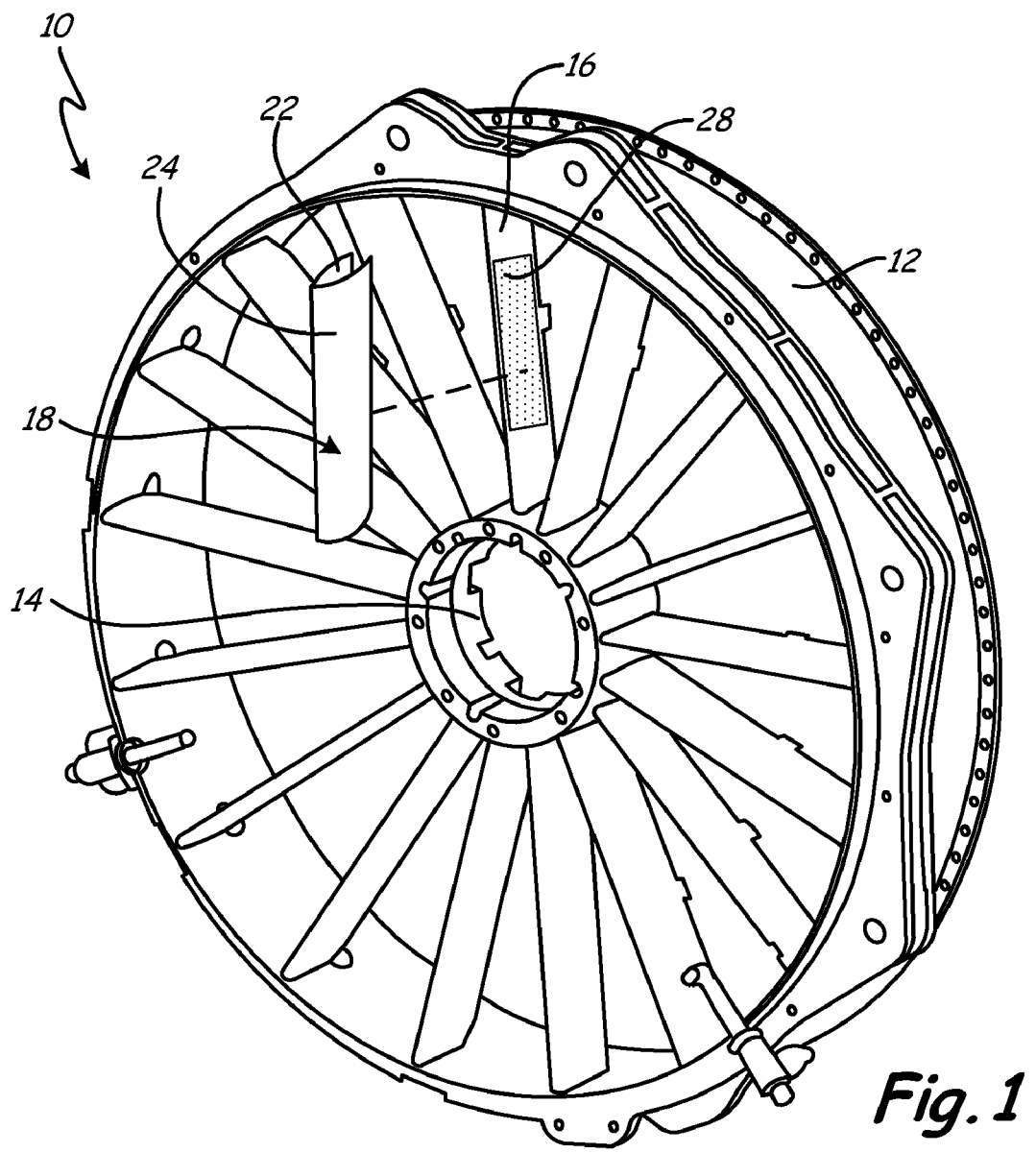
FIG. 1 is an exploded perspective view of a fan inlet case.

As shown in FIG. 1, a fan inlet case 10 has an outer hub 12, an inner hub 14, and a plurality of struts 16 extending therebetween. Struts 16 can each be covered with a fairing 18 having an inside surface 22 and an outside surface 24. Each strut 16 has an outer surface 26. Inside surface 22 of fairing 18 is attached to outside surface 24 of strut 16 using an adhesive 28, such as an adhesive of the type described in commonly-assigned U.S. application Ser. No. 11/494,830. Generally, in order for adhesive 28 to cure, it must be subjected to pressure and heat. Furthermore, the strict geometric limitations of fan inlet case 10 make it difficult to apply pressure to fairing 18 in order for adhesive 28 to cure and secure fairing 18 to strut 16.

Figure 2:
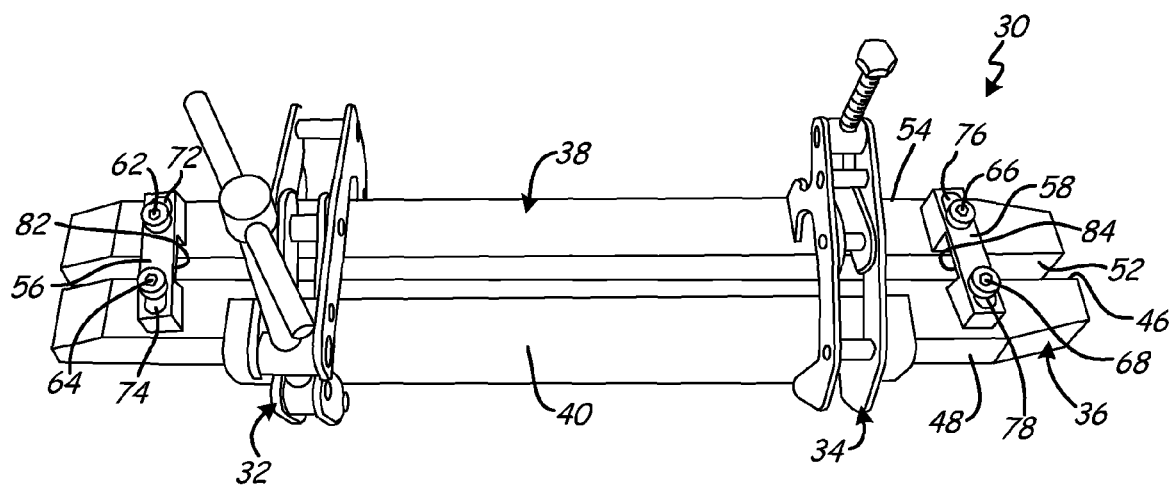
FIG. 2 is a top view of a pressure application device.

As shown in FIG. 2, pressure application device 30 includes clamps 32 and 34, a first jaw 36, a second jaw 38, and a cap 40. First jaw 36 and second jaw 38 apply pressure to the workpiece, in particular fairing 18. In order for the first jaw 36 and second jaw 38 to apply pressure to the workpiece, a force applicator applies force to cap 40. The force applicator can be a mechanical device, such as vices and clamps, or hydraulic or pneumatic devices (e.g., pressure cylinders). In the illustrated embodiment, clamps 32 and 34 are each threadably-adjustable cantilever C-clamps. Clamps 32 and 34 are positioned on cap 40 and second jaw 38 to apply a force to cap 40. When this force is applied to cap 40, cap 40 transmits the force through a spring mechanism (shown in FIG. 5 and described in detail later in this description) located between cap 40 and first jaw 38 to apply a controlled amount of pressure to the workpiece. The force transmitted to first jaw 38 is a function of the distance cap 40 moves toward first jaw 38 and the spring constant of the spring mechanism.

First jaw 36 has a front side 46 and a back side 48, and second jaw 38 has a front side 52 and a back side 54. First jaw 36 and second jaw 38 are configured so that pressure application device 30 can fit within the tight geometrical restrictions of mounting locations of a component, such as fan inlet case 10, when the adjacent struts are occupied by clamps. In order to meet these geometrical restrictions, the overall width of first jaw 36 (measured between front side 46 and back side 48) can be between about 0.64 cm (0.25 inch) and 2.54 cm (1 inches). Portions of first jaw 36 and second jaw 38 can be tapered as shown in the illustrated embodiment to reduce widths in selected areas, in order to further accommodate placement of device 30 in geometrically restricted areas (e.g., between struts 16 near inner hub 14 of inlet case 10). First jaw 36 can be made from stainless steel, titanium, aluminum or other metallic materials. In the present embodiment, first jaw 36 and second jaw 38 are substantially rectangular members, although depending on the desired pressure profile they can have various other shapes.

Front sides 46, 52 of jaws 36, 38 each form a clamping surface. Front sides 46, 52 can include a layer of material, such as an elastomer, silicone or other polymer, to create a soft face in order to not damage fairing 18 or other workpieces when pressure is applied.

In the illustrated embodiment, first jaw 36 is connected to second jaw 38 by support pieces 56, 58 and shoulder bolts 62, 64, 66, 68. Support pieces 56, 58 each have holes 72, 74, 76, 78 where shoulder bolts 62, 64, 66, 68 are inserted. Holes 72, 74, 76, 78 are elongated slots so that the spacing between first jaw 36 and second jaw 38 can be regulated. Support pieces 56, 58 can have notches 82, 84 to allow the workpiece to be inserted between first jaw 36 and second jaw 38 with enough clearance.

Figure 3:
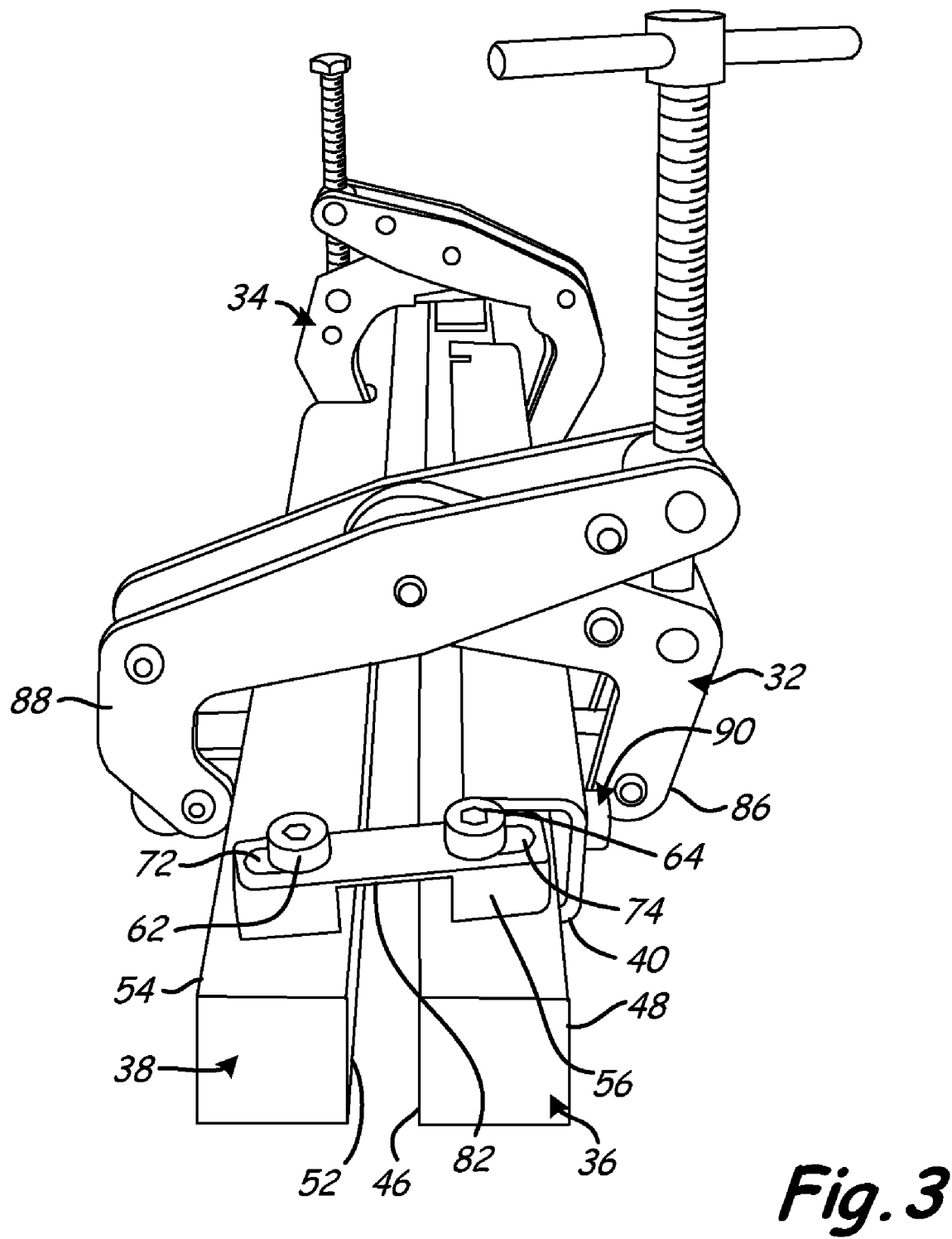
FIG. 3 is a side view of the pressure application device.

Cap 40 surrounds first jaw 36. In the illustrated embodiment, cap 40 is positioned between support piece 56 and support piece 58. As shown in FIG. 3, cap 40 is a C-shaped or U-shaped cap that covers back side 48 of first jaw 36. A first end 86 of clamp 32 is adjacent cap 40 and a second end 88 of clamp 32 is adjacent the back side 54 of second jaw 38. First jaw 36 is connected to second jaw 38 by support pieces 56, 58 and shoulder bolts 62, 64, 66, 68. When pressure is to be applied to the workpiece, clamps 32, 34 apply a force to cap 40 and to back side 54 of second jaw 38. When this force is applied to cap 40, cap 40 transmits the force through a spring mechanism (shown in FIG. 5 and described in detail later in this description) located between cap 40 and first jaw 38 to apply a controlled amount of pressure to the workpiece. As this force is applied to cap 40, first jaw 36 moves relative to second jaw 38. The movement of first jaw 36 relative to second jaw 38 is controlled by support pieces 56, 58.

Figure 4:
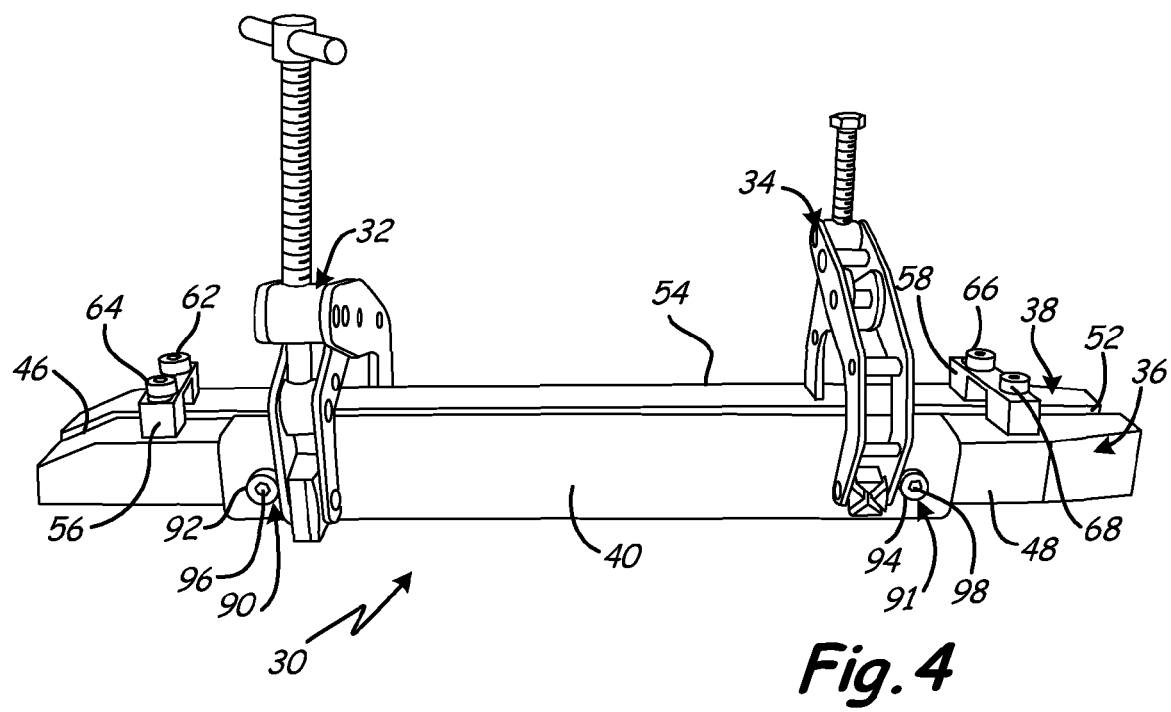
FIG. 4 is a front view of the pressure application device.

As shown in FIG. 4, pressure device 30 also has retainers 90, 91 that are comprised of alignment rods 92, 94 and disc members 96, 98. Each disc member 96, 98 is positioned onto an end of each alignment rod 92, 94. Disc members 96, 98 and alignment rods 92, 94 could be a single piece, such as a bolt or other fasteners. However, disc members 96, 98 can also be adjustable along alignment rods 92, 94. For example, disc members 96, 98 can be threaded rings (e.g., nuts) and alignment rods can be threaded rods (e.g., bolts). Retainers 90, 91 limit separation of cap 40 from first jaw 36. Furthermore, when no force is applied to cap 40, cap 40 abuts disc members 96, 98 of retainers 90, 91.

Figure 5:
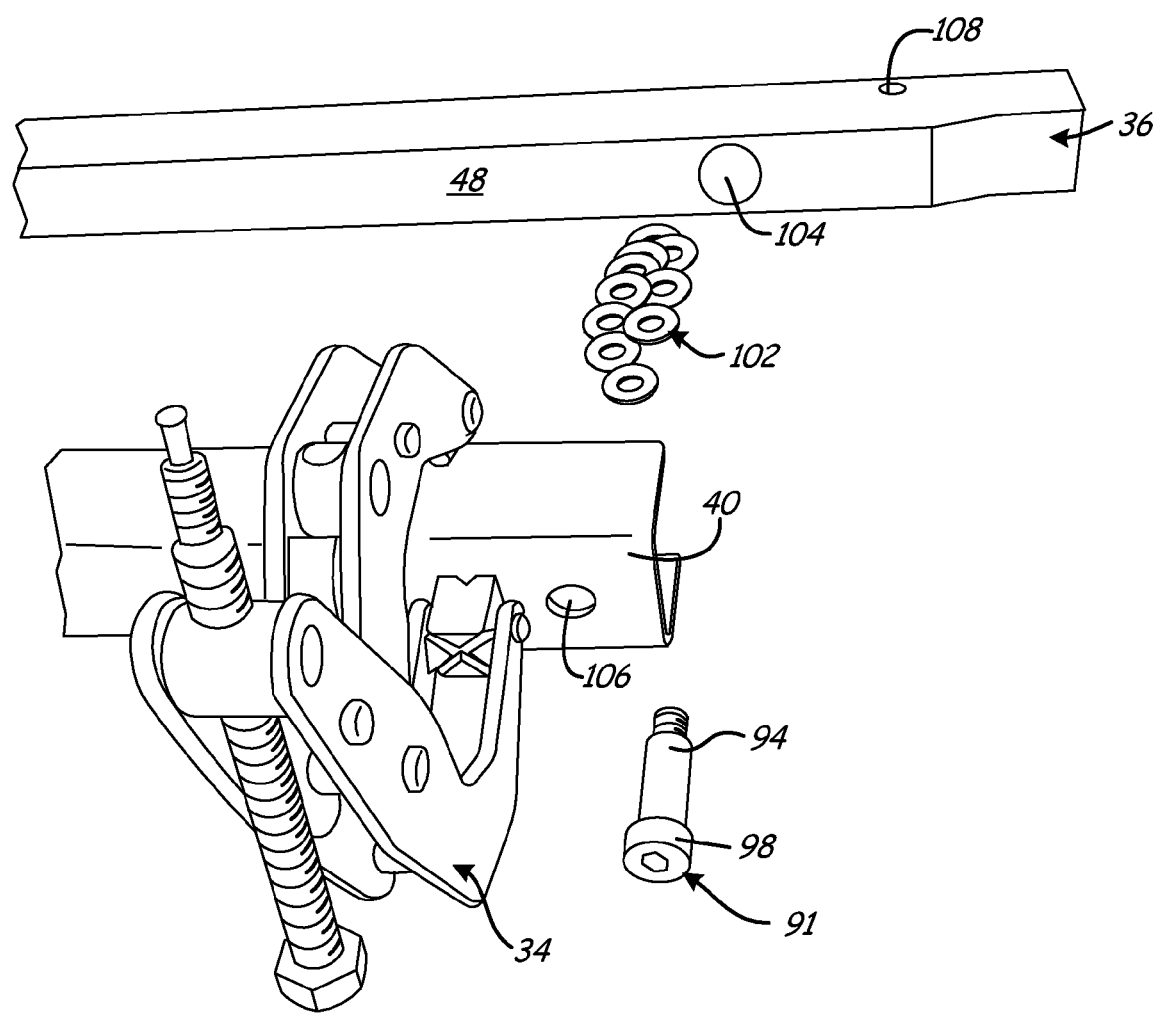
FIG. 5 is a perspective view of a disassembled portion of the pressure application device.

As shown in FIG. 5, each pressure transferring assembly is comprised of clamp 34, first jaw 36, cap 40, alignment rod 94, disc member 98, and spring 102. Spring 102 can comprise a plurality of springs that can be arranged in series, in parallel or in combinations thereof to achieve various pressure profiles. Springs 102 can be disc springs, coil springs, leaf springs, or other types of springs. In the illustrated embodiment, springs 102 are disc springs, which have a relatively low profile that helps reduce the overall thickness of the device 30. First jaw 36 has cavity 104, and springs 102 are inserted into cavity 104. By recessing springs 102 inside cavity 104, the overall thickness of pressure device 30 is significantly reduced. Cap 40 has a hole 106, and alignment rod 94 is inserted through hole 106 and into cavity 104. When inserted into cavity 104, alignment rod 94 is surrounded by spring 102. First jaw 36 also has a hole 108 wherein the shoulder bolt 68 can be inserted through the hole 78 in the support piece 58 and secured in first jaw 36.

Figure 6A:
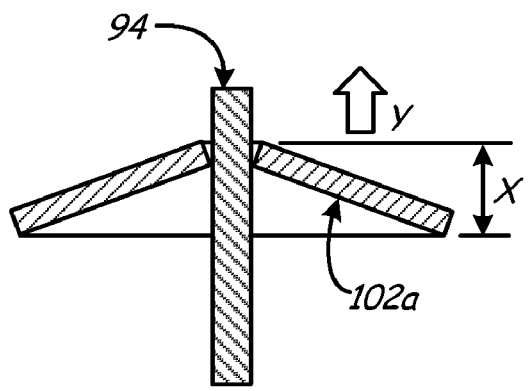
FIGS. 6A-6C are cross-sectional views of alternative spring arrangements for use with the pressure application device.
Figure 6B:
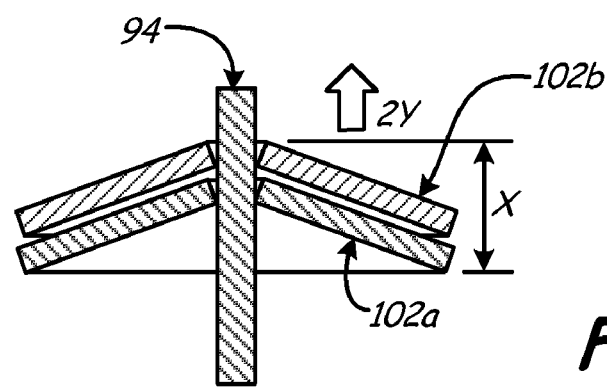
Figure 6C:
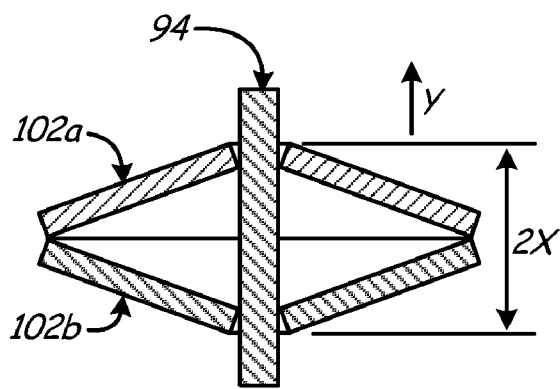

FIGS. 6A-6C are cross-sectional views of alternative spring arrangements for use with the pressure application device 30. As shown in FIG. 6A, a first disc spring 102a provides a maximum spring travel x and a maximum spring force y. Value of the maximum spring travel x and maximum spring force y are a function of mechanical properties of the spring 102a, and a suitable commercially-available disc springs can be selected to match the values desired for a particular application. If a first disc spring 102a is put in series with a second disc spring 102b both having identical spring properties, as shown in FIG. 6B, the maximum spring travel x will remain essentially constant while the maximum spring force will be 2y. However, if first disc spring 102a is put in parallel with second disc spring 102b, as shown in FIG. 6C, the maximum spring travel will be 2x, while the maximum spring force will remain y. Therefore, depending on how springs 102 are arranged inside cavity 104, different amounts of force can be applied to first jaw 36 and thus different amounts of pressure can be applied to fairing 18 in order to cure adhesive 28. Additional disc springs 102 can be utilized together in serial and/or parallel in order to achieve desired travel and force parameters. The use of springs allows a regulation of applied force, as explained further below.

Figure 7A:
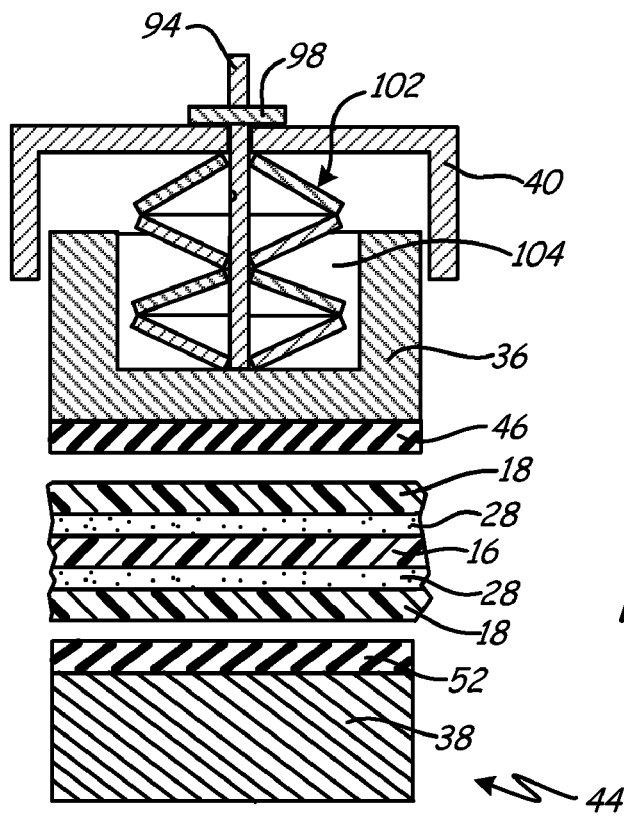
FIGS. 7A and 7B are cross-sectional views of the pressure application device and a workpiece before and after application of force.
Figure 7B:
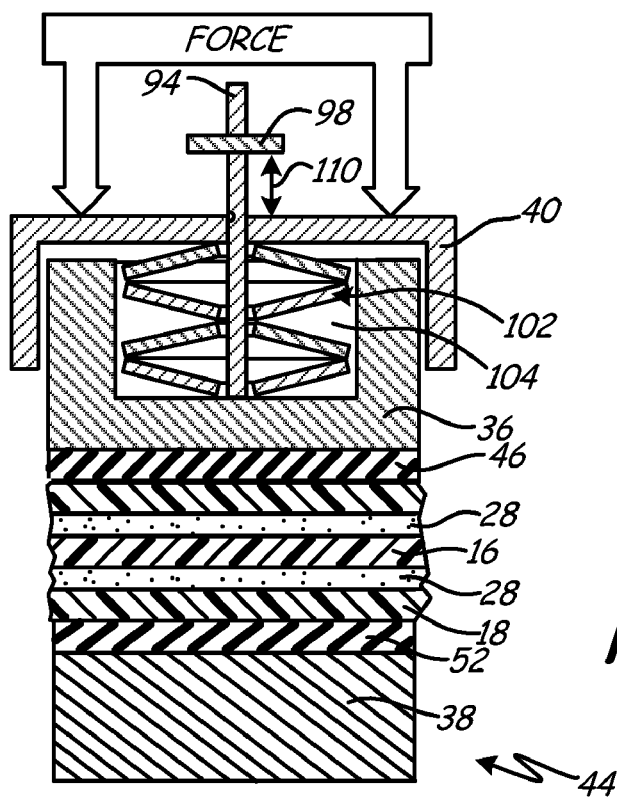

FIGS. 7A and 7B are cross-sectional views of the pressure application device 30 and a portion of the inlet case 10 before and after application of force, respectively. As shown in FIG. 7A, when pressure assemblies of the pressure application device 30 are at rest and no force is applied to cap 40, cap 40 rests against disc member 98. When force is applied to cap 40, as shown in FIG. 7B, gap 110 is created. Gap 110 is measurable and can be calibrated to the force applied to front side 46 of first jaw 36. Thus, a specific, known amount of force can be transferred to fairing 18 in order to cure adhesive 28 and adhere fairing 18 to strut 16. If disc member 98 is fixed on alignment rod 94, gap 110 may be adjusted by using a new disc member 98 and a new alignment rod 94 or if threaded, by adjusting the length of the alignment rod 94. If disc member 98 is adjustable on alignment rod 94, gap 110 may be calibrated by adjusting disc member 98 relative to the cap 40 when it is at rest. Besides calibrating gap 110, the force applied to the front side 46 of first jaw 36 can also be adjusted by changing the arrangement of springs 102 depending on the desired pressure profile as discussed previously. By combining springs 102 in various combinations of series and parallel arrangements, a desired maximum force can be applied and a known spring travel can be used to determine a desired size of gap 110.

Pressure application device 30 can have more than two pressure transferring assemblies located along first jaw 36. As mentioned earlier, a pressure transferring assembly comprises clamp 34, first jaw 36, cap 40, retainer 90, and spring 102. Pressure application device 30 can also have multiple caps 40 along first jaw 36, each cap 40 having at least two pressure transferring assemblies.

In one embodiment, pressure application device 30 is configured to apply a maximum pressure between about 0 N/mm$^2$ (0 psi) and 6.90 N/mm$^2$ (1000 psi) to a surface (e.g., to the fairing 18), preferably between about 0.345 N/mm$^2$ (50 psi) and 1.38 N/mm$^2$ (200 psi). Pressure application device 30 also can operate during the thermal cure cycle of the adhesive 28 at temperatures between about −17.8° C. (0° F.) and 232° C. (450° F.), preferably between room temperature (about 22° C. (72° F.)) and about 148° C. (350° F.), but could operate at temperatures greater than about 232° C. (450° F.) with a limited life.

It is possible to place pressure application device 30 into an oven (not shown) or other high temperature environment along with components being adhered (e.g., fan inlet case 10) in order to simultaneously apply pressure and heat to cure adhesive 28. Simple mechanical clamps alone, like prior art C-clamps, would generally not provide precise, controllable levels of force when placed in a high temperature environment, but rather would tend to vary the applied force due to thermal expansion of the clamps and/or workpiece. Moreover, the use of force sensing equipment in a high temperature environment like an oven would be difficult, and sensing equipment that could survive the high temperature environment tends to be cost-prohibitive. Pressure application device 30 utilizes springs 102 to regulate applied force while still allowing consistent performance in high temperature environments and a relatively compact overall size.

Although the present invention has been described with reference to preferred embodiments, workers skilled in the art will recognize that changes may be made in form and detail without departing from the spirit and scope of the invention. For example, the particular type and arrangement of springs used to regulate applied force can vary as desired for particular applications.

The invention claimed is:
1. A device comprising:
 a first jaw and a second jaw, each jaw having a front side and a back side, wherein each front side has a clamping surface and the clamping surfaces of the first jaw and the second jaw face one another, the first jaw and the second jaw being relatively movable toward and away from one another;

a cavity in the back side of the first jaw;

a spring partially extending into the cavity;

a cap having an interior surface and an exterior surface, wherein the interior surface of the cap faces the back side of the first jaw and contacts the spring so that force applied to the exterior surface of the cap is transmitted through the spring to the first jaw to move the first jaw towards the second jaw; and a support member, wherein the first and second jaws are mechanically linked together by the support member.

2. The device of claim 1, further comprising:

a retainer for limiting separation of the cap from the first jaw.

3. The device of claim 2, wherein the retainer further comprises:

a rod having a first end and a second end, the first end positioned within the cavity of the first jaw and surrounded by the spring and the second end extending through the cap; and a disc member mounted on the second end of the rod such that the disc member contacts the exterior surface of the cap when no force is applied.

4. The device of claim 3, wherein the disc member is mounted in a fixed position on the rod so that the spring compresses to a fixed length.

5. The device of claim 3, wherein the disc member is adjustably mounted along the rod so that the spring compresses to an adjustable length depending on position of the disc member on the rod.

6. The device of claim 1, wherein the compression spring comprises a plurality of spring elements arranged to transmit a desired force with a known spring travel.

7. The device of claim 6, wherein a first spring element is positioned in series with a second spring element.

8. The device of claim 6, wherein a first spring element is positioned in parallel with a second spring element.

9. The device of claim 6, wherein the spring elements are selected from the group consisting of disc springs, leaf springs, and coil springs.

10. The device of claim 1, and further comprising:

a clamp engaged with the cap and the second jaw to apply force to the cap that produces movement of the first jaw relative to the second jaw.

11. The device of claim 1, wherein the force is applied to the exterior surface of the cap by using a force applicator selected from the group comprising mechanical devices, hydraulic devices, pneumatic devices and combinations thereof.

12. The device of claim 1, wherein the clamping surface is at least partially coated with a polymer.

13. A device comprising:

a first jaw and a second jaw each having an interior surface and an exterior surface, the first jaw and the second jaw spaced apart and facing one another;

a first spring having a first end and a second end, the first end positioned within a first cavity in the exterior surface of the first jaw;

a second spring having a first end and a second end, the first end positioned within a second cavity in the exterior surface of the first jaw;

a cap having an exterior surface and an interior surface, wherein the interior surface abuts the second end of the first spring and the second end of the second spring; and a first retainer and a second retainer positioned such that, when no force is applied to the cap, the cap abuts the first retainer and the second retainer, and when a force is applied to the cap, the cap moves relative to the first retainer and the second retainer towards the first jaw.

14. The device of claim 13, wherein the force is applied to the cap by using a force applicator selected from the group comprising mechanical devices, hydraulic devices, pneumatic devices and combinations thereof.

15. The device of claim 13, and further comprising:

a first support member and a second support member connecting the first jaw to the second jaw to control movement of the jaws relative to one another.

16. The device of claim 13, and further comprising:

at least a third spring having a first end and a second end, the first end positioned within a third cavity in the exterior surface of the first jaw and the second end of the spring abuts the cap.

* * * * *